US007141264B2

(12) United States Patent
Zhang

(10) Patent No.: US 7,141,264 B2
(45) Date of Patent: Nov. 28, 2006

(54) FUNCTIONAL WATER

(75) Inventor: Shi Qiu Zhang, Tenafly, NJ (US)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 266 days.

(21) Appl. No.: 10/452,620

(22) Filed: Jun. 2, 2003

(65) Prior Publication Data
US 2004/0241299 A1 Dec. 2, 2004

(51) Int. Cl.
A23F 3/00 (2006.01)
(52) U.S. Cl. .................... 426/597; 426/435; 426/66
(58) Field of Classification Search ............. 426/597, 426/66, 435
See application file for complete search history.

(56) References Cited

U.S. PATENT DOCUMENTS

| 3,222,182 | A |   | 12/1965 | Henderson et al. |
| 3,250,704 | A | * | 5/1966  | Levendusky ........... 210/686 |
| 3,494,836 | A | * | 2/1970  | Standiford, Jr. ........... 203/7 |
| 4,135,001 | A | * | 1/1979  | Edmonds et al. ........ 426/250 |
| 4,797,293 | A | * | 1/1989  | Evans et al. ........... 426/330.3 |
| 4,822,579 | A | * | 4/1989  | Wagner ................. 422/263 |
| 5,927,170 | A |   | 7/1999  | Grill et al. |
| 6,022,576 | A |   | 2/2000  | Cirigliano et al. |
| 6,036,986 | A | * | 3/2000  | Cirigliano et al. ...... 426/330.3 |
| 6,241,893 | B1 | * | 6/2001  | Levy .................... 210/660 |
| 6,274,187 | B1 |   | 8/2001  | Lehmberg et al. |
| 6,413,570 | B1 |   | 7/2002  | Lehmberg et al. |
| 6,423,361 | B1 |   | 7/2002  | Lehmberg et al. |
| 6,423,362 | B1 |   | 7/2002  | Lehmberg et al. |
| 6,495,049 | B1 | * | 12/2002 | Van Esch ............... 210/709 |
| 6,871,014 | B1 | * | 3/2005  | Pierre .................. 392/457 |
| 2002/0083842 | A1 |   | 7/2002  | Kown |
| 2003/0064104 | A1 | * | 4/2003  | Stillman ............... 424/490 |

FOREIGN PATENT DOCUMENTS

JP         55-61982    * 10/1980

OTHER PUBLICATIONS

International Search Report on PCT/EP2004/005129 dated Jul. 27, 2004.
Pangborn e al., "Analysis of coffee, tea and artificially flavored drinks prepared from mineralized waters", Journal of Food Science, vol. 36, No. 2, 1971, pp. 355-362.
Al Fraij et al., "Comparative study of potable and mineral waters available in the State of Kuwait", Desalination, Elsevier Scientific Publishing Co., vol. 123, No. 2-3, pp. 253-264.
Awadallah et al., "Investigation of drinking- and Mile-water samples of upper Egypt", Water SA, vol. 19, No. 3, 1993, pp. 217-230.
Khan et al., "Performance of an aromatic polyamide hollow fiber membrane subjected to high salinity water", Desalination, Elsevier Scientific Publishing Co, vol. 105, No. 3, Jul. 1996, pp. 191-197.
Al-Redhaiman et al, "The Applicability of the local and international water quality guidelines to Al-Gassim region of central Saudi Arabia", Water Air and Soil Pollution, vol. 137, No. 1-4, Jun. 2002, pp. 235-246.

* cited by examiner

Primary Examiner—Anthony Weier
(74) Attorney, Agent, or Firm—Edward A. Squillante, Jr.

(57) ABSTRACT

Tea-based beverages prepared from functional water are described. The functional water comprises less than 200 ppm total dissolved solids and, when used to make a tea-based beverage, results in a beverage having superior flavor and appearance characteristics, even when up to 6% by weight of tea solids are present within the beverage.

9 Claims, No Drawings

FUNCTIONAL WATER

FIELD OF THE INVENTION

The present invention is directed to functional water. More particularly, the invention is directed to functional water comprising less than about 200 ppm total dissolved solids. The functional water of the present invention, when used to make a tea-based beverage, unexpectedly results in a beverage having superior flavor and appearance characteristics.

BACKGROUND OF THE INVENTION

Tea-based beverages are some of the most popular beverages with consumers. In fact, many studies indicate that tea-based beverages promote good health. For example, studies indicate that both green and black tea, which are derived from *Camellia sinensis*, comprise cancer fighting antioxidants.

Other studies indicate that people who drink one or more cups of tea per day may have half the heart attack risk than people who drink no tea.

Notwithstanding the advantages of drinking a tea-based beverage, it is not always routine to generate a consistent beverage. Particularly, the water used to make a desired tea-based beverage can have a significant impact on, among other things, the taste and appearance of the beverage.

When levels of certain ions within the water used to generate the tea-based beverage are too high or too low, the resulting beverage often tastes and looks inferior. For example, tea-based beverages made with reverse osmosis water can be bitter, sour, flat and metallic tasting. Moreover, such tea-based beverages made with conventional tap water can be weak tasting, lacking in astringency, cloudy and have hazy precipitates suspended therein.

It is of increasing interest to develop a means for generating a consistent tea-based beverage. This invention, therefore, is directed to functional water whereby the water comprises less than 200 ppm total dissolved solids. The functional water of the present invention unexpectedly can be used to make a consistent tea-based beverage with superior flavor and appearance characteristics. Particularly, the tea-based beverage made with the functional water of the present invention, surprisingly, has characteristics similar to that of beverages made with spring water which typically can have at least 35% by weight less dissolved solids than the functional water of this invention.

Additional Information

Efforts have been disclosed for making tea-based beverages. In U.S. Pat. Nos. 6,423,362; 6,423,361; 6,413,570; and 6,274,187, tea-based beverages are described.

Other efforts have been disclosed for making tea-based beverages. In U.S. Pat. No. 6,036,986, tea containing beverages with cinnamic acid are described.

Still other efforts have been disclosed for making tea-based beverages. In U.S. Pat. No. 6,022,576, flavoring materials for use in tea containing beverages are described.

None of the additional information above describes a functional water whereby the water has less than about 200 ppm of total dissolved solids and is suitable for use in making a superior tea-based beverage.

SUMMARY OF THE INVENTION

In a first aspect, the present invention is directed to functional water comprising:
(a) less than about 200 ppm of total dissolved solids and more total dissolved solids than reverse osmosis water; and
(b) less than about 50 ppm bicarbonate wherein the functional water has a pH from about 7.0 to less than about 8.5.

In a second aspect, the present invention is directed to a method for making a tea-based beverage comprising the functional water of the first aspect of the invention.

In a third aspect, the present invention is directed to a tea-based beverage comprising the functional water of the first aspect of this invention.

Tea based beverage, as use herein, is defined to mean any beverage that comprises a component derived from *Camellia sinensis*. Total dissolved solids means the total amount of solids that can be recovered in dry form when water is evaporated off of the functional water of this invention. Ions are defined to mean electrically charged (e.g., monovalent or divalent) atoms or radicals generated from the total dissolved solids in the functional water of this invention and selected from the group consisting of magnesium, calcium, sulfate, sodium, potassium, bicarbonate, fluoride and chloride ions. Reverse osmosis water means pure $H_2O$ and comprising no ions. Superior flavor, as used herein, means a taste grade of at least good as determined by a trained flavor panel. Superior appearance characteristics means having a Hunter Haze Value from about 15 to about 50 as determined with a Hunterlab DP-9000 Spectrophotometer at about ambient temperature in a 5 cm cell.

DETAILED DESCRIPTION OF THE PREFERRED EMBODIMENTS

The only limitation with respect to the method of generating the functional water of the present invention is that the method employed results in water having less than about 200 ppm total dissolved solids, more dissolved solids than reverse osmosis water and less than about 50 ppm bicarbonate. Such a method can be one where dry solids are added to precursor tap water, spring water or reverse osmosis water to generate the functional water of the present invention. Other methods can include filtration systems that have a non-functional (e.g., tap) water input and may be designed to deliver or output the functional water described. Often, the functional water of the present invention comprises from about 0 to about 95 ppm ions which are divalent and from about 50 to less than about 200 ppm ions which are monovalent, and preferably, from about 5 to about 80 ppm ions which are divalent and from about 50 to about 175 ppm ions which are monovalent, and most preferably, from about 10 to about 65 ppm ions which are divalent and from about 50 to about 155 ppm ions which are monovalent, including all ranges subsumed therein. In another preferred embodiment, the functional water of the present invention comprises from about 0 to less than about 50 ppm bicarbonate, and most preferably, from about 0.001 to about 10 ppm bicarbonate, including all ranges subsumed therein.

Regarding the tea-based beverage made with the functional water of this invention, such a beverage may be made from tea leaves, tea powders, tea concentrates or a combination thereof, and preferably, the tea leaves, powders and concentrates made commercially available by Unilever Bestfoods under the Lipton Brand. When tea leaves are employed, the tea-based beverage, for example, is made by pouring, dripping or spraying the functional water of this invention over the tea leaves in a sachet (e.g., bag) or over the tea leaves loose within filter paper. The process for making the tea-based beverage from tea leaves can be on a cup-by-cup basis or via a large batch basis which employs a conventional tea brewing apparatus. A preferred apparatus suitable to utilize the functional water of this invention to brew a superior tea-based beverage from leaf tea has been designed by Unilever Bestfoods under the Lipton Brand. An example of such an apparatus is disclosed in U.S. Pat. No. 5,927,170, the disclosure of which is incorporated herein by reference.

When the functional water of the present invention is combined with or added to tea powder (i.e., instant tea) to make a superior tea-based beverage, the tea powder is usually prepared by extracting raw tea leaves to produce a concentrated tea extract. The concentrated tea extract usually contains from about 2 to about 70% by weight solids and it is subsequently subjected to an evaporation process to remove water, resulting in the desired tea powder. Illustrative examples of the types of tea powders which may be used in this invention are disclosed in U.S. Pat. No. 3,222,182, the disclosure of which is incorporated herein by reference.

In a preferred embodiment, the functional water of the present invention is used with a shelf stable tea concentrate. Such a shelf stable tea concentrate is made by continuous or batch extractions with tea leaves to produce an extract which is centrifuged and concentrated. The resulting concentrate may be pasteurized, aseptically packed and suitable to produce ready-to-drink (RTD) tea even after being stored for three months. In an especially preferred embodiment, the shelf stable tea concentrate employed with the functional water of this invention has mixed with it a carbohydrate such as sucrose and/or corn syrup, especially high fructose corn syrup, in order to enhance concentrate stability.

When making a superior tea-based beverage with the functional water of this invention and shelf stable tea concentrate, typically from about 25 to about 40% by weight of tea concentrate, (based on total weight of the shelf stable tea concentrate) having about 5 to about 65% by weight tea solids (based on total weight of tea concentrate) is combined with select carbohydrates in a ratio of about 1.5 parts or more of carbohydrate to one part of tea solids. Tea aroma and tea flavor may be added (collectively between about 5 to about 15% by weight based on total weight of shelf stable tea concentrate). Preservatives (e.g., potassium sorbate, sodium benzoate), acidulants (e.g., citric acid), food grade colorants and water may also be added to the shelf stable tea concentrate and such additives, collectively, make up from about 5 to about 12% by weight of the total weight of the shelf stable tea concentrate. Carbohydrate, in a preferred embodiment, makes up from about 10 to about 75%, and preferably, from about 40 to about 50% by weight of the shelf stable tea concentrate.

The tea concentrate used to make the preferred stabilized tea concentrate suitable for use with the functional water of this invention is derived from conventional processes that use water, and enzyme systems that hydrolyze tea leaf cell walls to yield a tea extract slurry. Leaf is separated from the slurry which is then hot extracted. The resulting tea extract is pasteurized, concentrated (at least once) and clarified to produce the tea concentrate used to make the preferred shelf stable tea concentrate.

The preferred shelf stable tea concentrates suitable for use with the functional water of this invention are described in U.S. Pat. Nos. 6,274,187 and 6,413,570, the disclosures of which are incorporated herein by reference.

When making the superior tea-based beverage with the functional water of this invention and shelf stable tea concentrate, any commercially available RTD dispensing apparatus may be used. Such an apparatus is usually equipped with a reservoir for the shelf stable tea concentrate and at least one conduit for delivering the water. In a preferred embodiment, shelf stable tea concentrate is pumped from the reservoir within the RTD dispensing apparatus and into a mixing chamber. A portion of the functional water of this invention is delivered to the RTD dispensing apparatus and heated within the same to a temperature from about 75 to about 90° C. The resulting heated functional water is then combined (or simultaneously delivered) with the shelf stable extract within the mixing chamber, yielding a diluted concentrate. The diluted concentrate is then pumped to or combined with additional functional water, preferably at ambient temperature, to produce a superior tea-based beverage. In a preferred embodiment, no more than 10% of the total amount of functional water employed to make the tea-based beverage is heated, and most preferably, from about 0.5% to about 5.0% by weight of the total amount of functional water is heated. The preferred apparatus suitable for use with the functional water of this invention is described in U.S. patent application Ser. No. 10/027,848, entitled, Beverage Brewing System and Method for Brewing a Beverage and filed Dec. 20, 2001, the disclosure of which is incorporated herein by reference.

In another preferred embodiment, the functional water of this invention has a pH from about 7.0 to about 8.5, and preferably, from about 7.0 to about 7.7.

The resulting tea-based beverage obtained, regardless of tea leaf, powder or concentrate is used, typically has enough functional water to yield beverage comprising from about 0.05 to about 6.0%, and preferably, from about 0.1 to about 3.0%, and most preferably, from about 0.2 to about 0.6% by weight tea solids, based on total weight of the tea-based beverage and including all ranges subsumed therein.

The superior tea-based beverage prepared from the functional water of the present invention unexpectedly has superior taste/flavor characteristics, is free of precipitates, and has excellent appearance characteristics. In an especially preferred embodiment, darkness (L) and redness (a) of the superior tea-based beverage, as determined with a Hunterlab DP-9000 Spectrophotometer at about ambient temperature in a 5 cm cell, are each, independently, from about 25 to about 35.

The examples below are provided to facilitate an understanding of the present invention. The examples are not intended to limit the scope of the invention as described in the claims.

EXAMPLE 1

Eight (8) water types, as shown in Table I, were made by adding sodium bicarbonate; magnesium, potassium, calcium and sodium chloride; sodium fluoride; magnesium sulfate to spring water or reverse osmosis water, or simply by using tap water.

TABLE I

Water Types (PPM Ions)

|  | Tap[i] 1 | Tap[ii] 2 | Spring[iii] | Functional 1[iv] | Functional 2[iv] | Functional 3[v] | Functional 4[v] | Reverse Osmosis[vi] |
|---|---|---|---|---|---|---|---|---|
| Bicarbonate | 82.4 | — | 14.0 | 10.5 | 36.5 | 22.4 | 45.2 | 0.0 |
| Chloride | 160.0 | 67.0 | 5.3 | 23.7 | 55.1 | 48.5 | 52.5 | 0.0 |
| Fluoride | 0.2 | 0.7 | 0.0 | 0.7 | 0.8 | 0.0 | 0.0 | 0.0 |
| Sulfate | 10.0 | 24.0 | 3.2 | 3.3 | 8.8 | 21.2 | 3.2 | 0.0 |
| Calcium | 39.1 | 55.0 | 5.3 | 4.3 | 11.1 | 29.6 | 5.3 | 0.0 |
| Magnesium | 7.6 | 10.0 | 0.9 | 0.8 | 2.2 | 5.4 | 0.9 | 0.0 |
| Potassium | 2.0 | 6.1 | 0.7 | 4.3 | 10.5 | 0.7 | 8.8 | 0.0 |
| Sodium | 9.2 | 38.0 | 2.1 | 12.7 | 28.0 | 2.1 | 39.7 | 0.0 |
| Total Dissolved Solids | 310.1 | 230.0 | 45.0 | 60.3 | 152.5 | 142.8 | 169.1 | 0.0 |

[i]tap water, Englewood Cliffs, NJ - Winter Season
[ii]tap water, Englewood Cliffs, NJ - Spring Season
[iii]made commercially available by Poland Spring ®
[iv]made from solid addition to reverse osmosis water
[v]made from solid addition to spring water
[vi]deionized water

EXAMPLE 2

Eight (8) tea-based beverages were made by mixing stabilized tea concentrate (made commercially available by Unilever Bestfoods under the name Lipton Brewed Iced Tea, suitable for use with the Lipton Brewed Ice Tea System) with the eight water types from Example 1. The amount of water and tea concentrate used resulted in eight (8) tea-based beverages having about 0.28% tea solids. The eight (8) tea-based beverages were analyzed for Haze Value, darkness (L) and redness (a) utilizing a Hunterlab DP-9000 Spectrophotometer at ambient temperature in a 5 cm cell. The results obtained are set forth in Table II.

TABLE II

|  | Tap 1 | Tap 2 | Spring[iii] | Functional 1 | Functional 2 | Functional 3 | Functional 4 | Reverse Osmosis |
|---|---|---|---|---|---|---|---|---|
| Haze | 70.93 | — | 19.36 | 16.19 | 30.78 | 50.62 | 29.69 | 6.30 |
| L | 21.35 | — | 28.73 | 29.74 | 28.51 | 27.24 | 28.81 | 30.37 |
| a | 24.79 | — | 29.18 | 29.30 | 28.82 | 27.62 | 29.88 | 29.59 |

EXAMPLE 3

Portions of the eight (8) beverages prepared in Example 2 were given to trained flavor panelists. The panelists sampled/tasted each tea-based beverage (rinsing their mouths with water and having a cracker between each beverage) and rated the beverages for overall flavor on a scale of poor-to-good-to-excellent and on specific characteristics on a 1 to 10 scale with 10 being the strongest. The average of the results obtained are set forth in Table III.

TABLE III

|  | Tap 1 | Tap 2 | Spring Water | Functional 1 | Functional 2 | Functional 3 | Functional 4 | Reverse Osmosis |
|---|---|---|---|---|---|---|---|---|
| Overall Taste | Poor | Poor | Excellent | Excellent | Excellent | Good | Good | Poor |
| Astringency | 4 | 4 | 7 | 7 | 7 | 6 | 5 | 8 |
| Freshness | 5 | 5 | 9 | 9 | 9 | 6 | 8 | 9 |
| Sweetness | 4 | 4 | 5 | 5 | 5 | 5 | 7 | 3 |
| Bitterness | 4 | 4 | 8 | 8 | 8 | 7 | 6 | 9 |
| Smoothness | 8 | 8 | 5 | 6 | 6 | 6 | 7 | 5 |

The results above indicate that tea-based beverages made with the functional water of the present invention unexpectedly display superior flavor and appearance characteristics.

What is claimed is:

1. A tea-based beverage comprising:
   (a) tea solids; and
   (b) functional water comprising less than about 200 ppm of total dissolved solids, more total dissolved solids than reverse osmosis water, less than about 50 ppm bicarbonate, and from about 50 to about 200 ppm ions which are monovalent, wherein the functional water has a pH from about 7.0 to less than about 8.5, and the tea-based beverage comprises from about 0.05 to about 6% by weight tea solids.

2. The tea-based beverage according to claim 1 wherein the tea-based beverage is ready-to-drink.

3. The tea-based beverage according to claim 1 wherein the beverage comprises from about 0.001 to about 10 ppm bicarbonate, from about 50 to about 200 ppm ions which are monovalent and from about 0 to about 95 ppm ions which are divalent.

4. The tea-based beverage according to claim 1 wherein the tea-based beverage has a Hunter Haze Value from about 15 to about 50.

5. The tea-based beverage according to claim 1 wherein the tea-based beverage has, independently, a Darkness value (L) and a redness value (a) from about 25 to about 35.

6. The tea-based beverage according to claim 1 wherein the tea solids make up from about 0.1 to about 3.0% by weight of the tea-based beverage.

7. The tea-based beverage according to claim 1 wherein the tea solids are provided from a tea concentrate comprising carbohydrate.

8. The tea-based beverage according to claim 1 wherein the functional water has at least about 45 ppm total dissolved solids.

9. The tea-based beverage according to claim 1 wherein the functional water has at least about 60.3 ppm total dissolved solids.

* * * * *